T861006

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 1, 1969

861 O.G. 18

728,901

SUBSTITUTED THIODIACYL HYDRAZIDES

Clarence E. Tholstrup, P.O. Box 511,
Kingsport, Tenn. 37662

Filed May 14, 1968. Published Apr. 1, 1969
Class 260—45.8
No Drawing. 14 Pages Specification

Compounds having the following general formula are disclosed:

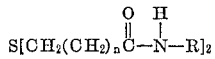

wherein $n$ is an integer of 0, 1 or 2, and R is one of the following groups:

(I)

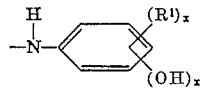

(II)

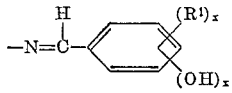

(III)

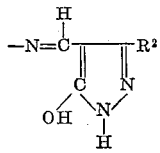

wherein $x$ is an integer of 0. 1 or 2; $R^1$ is independently hydrogen or an alkyl radical having 1 to 18 carbon atoms; and $R^2$ is an alkyl radical having 1 to 18 carbon atoms, a phenyl radical, or a substituted phenyl radical.

The compounds are stabilizers for polymers, e.g., polyolefins, particularly polymers that contain small amounts of certain metals, e.g., copper, and/or metal salts,